United States Patent [19]
Von Glehn

[11] Patent Number: 5,681,374
[45] Date of Patent: Oct. 28, 1997

[54] DEVICE FOR THE SEPARATION OF MICROSCOPIC PARTICLES OUT OF AIR

[75] Inventor: Andreas Von Glehn, Taby, Sweden

[73] Assignee: Freshman AB, Sollentuna, Sweden

[21] Appl. No.: 557,173

[22] PCT Filed: Jun. 7, 1994

[86] PCT No.: PCT/SE94/00545

§ 371 Date: Apr. 9, 1996

§ 102(e) Date: Apr. 9, 1996

[87] PCT Pub. No.: WO95/00248

PCT Pub. Date: Jan. 5, 1995

[30] Foreign Application Priority Data

Jun. 18, 1993 [SE] Sweden ............................ 9302117

[51] Int. Cl.⁶ ............................................. B03C 3/016
[52] U.S. Cl. ....................... 96/16; 55/279; 96/17; 422/24
[58] Field of Search ................... 96/16, 17, 96, 96/97, 92–95, 98–100; 55/279; 422/24

[56] References Cited

U.S. PATENT DOCUMENTS

| | | | |
|---|---|---|---|
| 2,277,712 | 3/1942 | Otto | 96/97 X |
| 2,593,869 | 4/1952 | Fruth | 96/16 |
| 3,744,216 | 7/1973 | Halloran | 96/16 |
| 3,798,879 | 3/1974 | Schmidt-Burbach et al. | 96/16 |

FOREIGN PATENT DOCUMENTS

| | | | |
|---|---|---|---|
| 218450 | 11/1957 | Australia | 96/97 |
| 2374938 | 7/1978 | France | 96/17 |
| 1002012 | 3/1983 | U.S.S.R. | 96/96 |
| 1125053 | 11/1984 | U.S.S.R. | |
| 848446 | 9/1960 | United Kingdom | 96/97 |
| 2090547 | 7/1982 | United Kingdom | 96/96 |
| 8404467 | 11/1984 | WIPO | |
| 9500248 | 1/1995 | WIPO | 96/17 |

OTHER PUBLICATIONS

Derwent's abstract, No. 85–139861/23, 233k 8523, Abstract of SU, 1125053 (As UKR Phys Org Che), 23 Nov. 1984.

*Primary Examiner*—Richard L. Chiesa
*Attorney, Agent, or Firm*—Young & Thompson

[57] ABSTRACT

A device for the removal of microscopic particles from air includes a tube which in a certain cross-section has a replaceable, suitably ionizing particle separation unit (4) with a multitude of threads or strips (10) which are held together in a common frame structure (11) extending across the tube. The strips (10) are arranged to be set in motion in relation to each other by the passing air, thereby generating static electricity for attracting micro particles from the air to the strips. The frame structure (11) is made of a flexible band formed into loops, the strips being affixed on the band, the frame structure also including a plurality of pipe- or tube-forming members located amongst the band loops, in order to distribute the air flow through the frame structure.

20 Claims, 2 Drawing Sheets

DEVICE FOR THE SEPARATION OF MICROSCOPIC PARTICLES OUT OF AIR

TECHNICAL FIELD OF THE INVENTION

The present invention relates to a device for the separation of microscopic particles out of air.

BACKGROUND OF THE INVENTION AND PRIOR ART

In normal indoor air, generally large quantities of microscopic and ultra-microscopic particles exist even in those cases where the incoming air is filtered in conventional filters before it is let in. One explanation to this phenomenon is that these filters are only capable of removing comparatively large constituents, i.e., generally speaking visible particles, while microscopic and ultra-microscopic particles pass the filters without being withheld. Another explanation is that in a room, different activities per se cause emissions of particles, man and animal being important particle-producing sources. Thus, investigations have shown that, e.g., such an ordinary activity as human walking gives rise to about 5 to 7 million particles per minute, while for instance physical exercising brings about 15 to 30 million particles per minute. The micro particles existing indoors can be of a most varied character, being composed of for instance mites, bacteria, virus, pollen, spores, dust, fibers, fumes, gases, etc. Under some circumstances, the existence of micro particles is without significance. However, under other circumstances it can be most aggravating, for instance at the manufacturing of most sensitive products, such as drugs, computer chips and similar, or for allergics and others who are oversensitive in one way or another to certain substances in the air.

In order to overcome the above related problems, a number of different arrangements and devices have been developed, e.g., a type of circulation apparatus that takes in air via an inlet, makes it pass one or several micro-filters and then blows out the cleaned air into the room. The micro-filters in such apparatus can inter alia be made of layers of polymer fibers (for instance so called electrete fibers which are marketed under the name FILTRETE) which form electrostatically charged dipoles, these dipoles being able to attract to their surfaces also microscopic particles, i.e., particles which are smaller than 1 μm. Although the fibers in this filter layer are interlaced into a fluffy, low-resistant network, this network becomes substantially immobile and stable and the micro particles agglomerate in the randomly or irregularly shaped cavities between its fibers. For instance, initially after the manufacture of the electrete fibers their dipoles can have a relatively high electrostatic charge, which however can only be upheld for a certain, limited period of time. Gradually, the charge will diminish and eventually it will almost disappear. The fibers of the filter layer will then loose their capability of attracting and binding the micro particles, what in turn can cause a drastic deterioration of the separation capacity of the filter. In other words, the filter of the apparatus gets a limited life and, therefore, requires a careful surveillance.

Further, in SU 1 125 053 a device is disclosed, having a particle separator that comprises a multitude of elongated and flexible elements in the form of polymer film strips, these strips being held together at one end in a frame structure. In their loose, deformable portions downstreams of the holding frame structure, these elements are arranged to be set in motion relative to each other by the passing air, thereby continuously effecting a rubbing of the elements against each other during running, thus generating a static electricity with the purpose of attracting micro particles out of the air. It is true that by this known construction, which represents the prior art as accounted for in the preamble of appended claim 1, a continuous charging of the elements with static electricity is attained by the influence of the passing air. However, a serious disadvantage of this known arrangement is that the frame structure consists of a simple wire grating of a small or even non-existent axial extension, through which the air can pass without the frame structure exerting any flow-distributing effect. In practice, this results in the passing air attaining a very high flow speed at the central area of the grating while the speed at the peripheral areas is low. As a consequence thereof, the strip-rubbing effect of the air is concentrated to the middle of the device. Therefore, the strips being peripherally mounted will have a very mediocre particle-attracting effect, which means that the total air-cleaning capacity of the arrangement is low.

OBJECTS AND FEATURES OF THE INVENTION

The present invention aims at eliminating the above-mentioned inconveniences of the known device and creating a device which accomplishes an efficient particle removal. Thus, a main object of the invention is to provide a device the particle separator of which is constructed in such a way that it is capable of continuously and automatically producing good static electricity in substantially all of the particle-capturing elements by forcing all the air to pass through the micro-particle-capturing elements and distributing the air throughout the frame structure, without the occurrence of any leaking air streams which would otherwise escape purification by the elements.

According to the present invention, the above-mentioned objects are attained by the features described herein.

FURTHER ELUCIDATION OF PRIOR ART

Furthermore, in WO 84/04 467 it is disclosed to use elongated, flexible or floppy strips which may contain electrostatically charged fibers for attracting particles. However, in that case the strips are circularly located in the area in front of a porous, air-pervious filtering wall being made of for instance plied paper in the form of a cylinder within a tube through which the air is passed during filtration. More specifically, the strips are arranged without any passage-restraining frame structure in a comparatively thin layer, substantially parallel to the filter wall, the air passing through the strip layer as well as the filter wall and the strips having the main task of liberating the upstream surface of the filter wall from particles by mechanical activation, in this way increasing the useful life of the filter wall.

BRIEF DESCRIPTION OF THE APPENDED DRAWINGS

In the drawings are:

FIG. 1 a perspective, cross-sectional view showing one embodiment of the device according to the present invention, and FIG. 2–3 schematic, perspective views showing two different steps at the making of the particle separator unit comprised by the device.

DETAILED DESCRIPTION OF A PREFERRED EMBODIMENT OF THE INVENTION

Figure 1:
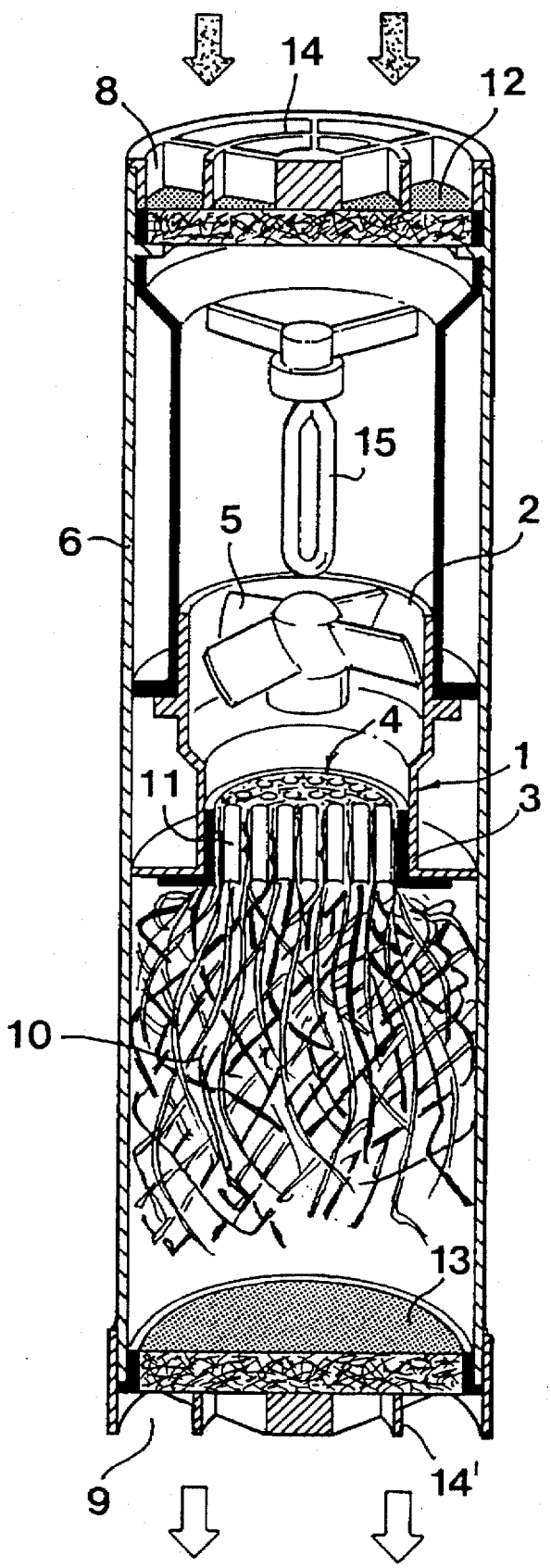

In FIG. 1 reference numeral 1 designates a tube which has an inlet 2 and an outlet 3 and in which a particle separation unit according to the invention is mounted, said unit being designated by numeral 4 in its entirety. Further, a fan 5 is comprised within tube 1, said fan being able to set air in motion from inlet 2 towards outlet 3. As shown in Fig. 1, fan 5 is mounted upstreams of particle separation unit 4, which implies that the fan sucks air into inlet 2 and presses it through unit 4. According to the example shown, tube 1 has the character of a unit which in turn is mounted within an outer housing or envelope 6. In the present case, this housing or envelope also has the form of a tube and equally to the unit tube 1, also has an inlet 8 and an outlet 9.

The tube 1, into which the particle separation unit 4 is inserted, may in practice be made of plastic or sheet-metal, which are impervious to air, this implying that the air at its passage from inlet to outlet has to pass through particle separation unit 4 without penetrating the wall of the tube. The term "tube" as used in the present document should be interpreted in widest sense, it being intended to include any possible cross-sectional configuration of a wall or wall construction delimiting a cavity through which air can pass from an inlet to an outlet. In this connection, it is essential that the tube wall in question be substantially tight so that no air can escape through the tube wall as such, but must necessarily pass axially through unit 4, which restrains entirely the air passage at the corresponding tube cross-section.

Figure 2:
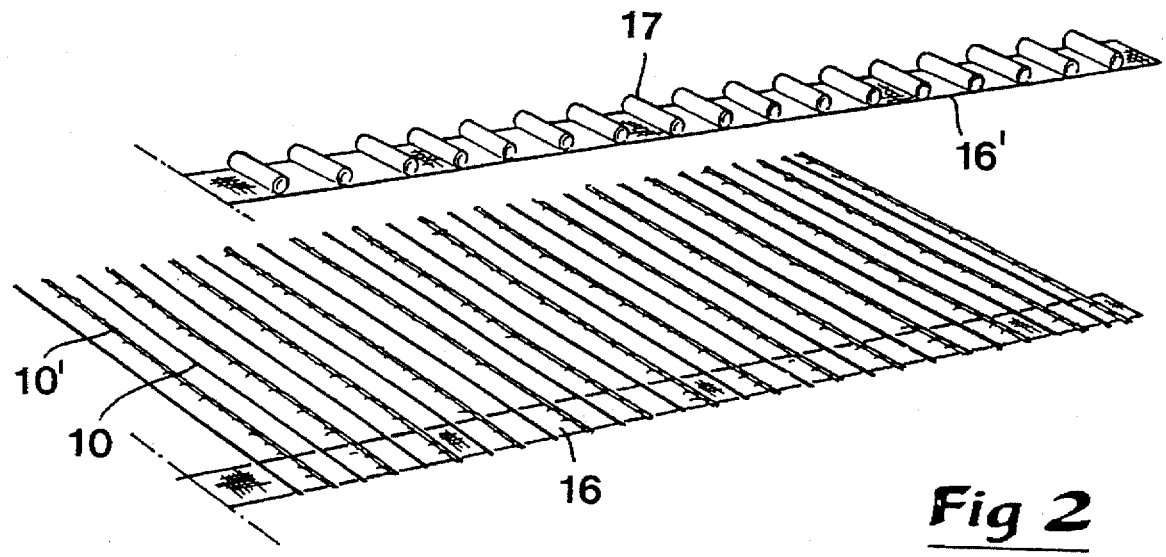
Figure 3:
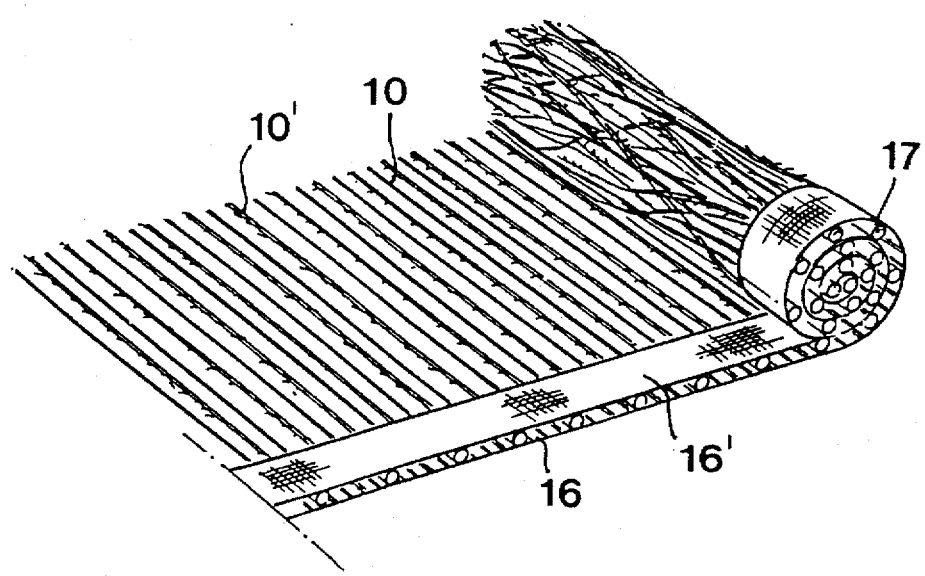

Particle separation unit 4 comprises a large multitude of elongated, flexible or floppy elements 10 which are held together at their ends by a common, air-pervious frame structure 11 of stiff character, this frame structure extending across the longitudinal axis of the tube and intercepting the cross-section of the tube substantially completely. In practice, unit 4 can be realized in different ways of which a preferred one is shown in FIG. 2 and 3. All different feasible embodiments have in common that the flexible elements 10 are arranged to be set in motion relative to each other by the passing air in their deformable portions being situated downstreams of frame structure 11. Thereby, the elements will be rubbed against each other and generate static electricity in and around each element so that these are enabled to attract micro particles existing in the air. By the fact that the elements are continually held in motion as soon as the fan has been switched on, an incessant charging of the elements with static electricity takes place, this implying that the elements maintain their capability of attracting particles during very long periods of time.

In its entirety, the device depicted in FIG. 1 has the form of an air cleaning apparatus which, standing by itself, can be mounted or installed in any room or space. Besides fan 5 and particle separation unit 4, the apparatus in the example also includes a number of fixed filters of a conventional or arbitrary sort. Thus, in the example a fixed filter 12 is shown at the inlet and a similar filter 13 at the outlet. Protecting grids 14, 14' are provided on the outer surfaces of filters 12, 13. Moreover, according to the embodiment shown in FIG. 1, a lamp 15 for the emission of ultra-violet light for killing bacteria is provided in the apparatus, more specifically in the inset tube 1. By means of such a UV-lamp, it is possible to kill for instance bacteria, virus, pollen, mites, spores and akin brought by the air before the air leaves the apparatus. The UV-lamp 15 in the example is mounted upstreams of the particle separation unit 4. It may, however also be mounted downstreams of said unit, as long as it is placed upstreams of outlet filter 13.

In practice, fixed filters 12, 13 may advantageously consist of so called electrete filters, for instance of the kind marketed under the name FILTRETE. These filters are made of suitable polymeric material, e.g., polypropylene, to which has been conferred a bipolar charge giving rise to a very strong electrical field around the fibers. By means of the achieved large attraction force towards micro particles in the air, the fibers can be arranged in a loose or fluffy structure which guarantees that the pressure drop of the air through the filter is minimized.

Reference is now made to FIG. 2 and 3 which illustrate an embodiment of the above mentioned particle separator unit 4. In this example, the production starts off from two flexible bands, for instance glass fiber bands 16, 16', of which at least one serves as a carrier for flexible or floppy elements 10, 10' having the form of threads, strips, fibers, fiber-like means, or combinations thereof. Suitably, these elements can be attached to band 16 by glueing. To the other band 16' there are affixed a number of means 17 which facilitate the air flow through frame structure 11, for instance in the form of diminutive pieces of tubes, pipes, highly porous bodies or similar. After the bands 16, 16' having been provided with threads 10 and means 17, the former are rolled into a roll as shown in FIG. 3, at the same time as the bands advantageously are glued together. When the roll has reached a suitable diameter, the bands are cut off, whereafter a new roll is produced, etc. As clearly shown in FIG. 3, threads 10, which are initially located in a common plane, will form a substantially cylindrical thread- or element-unit when the frame structure-forming, substantially cylindrical band roll has attained its final shape. In practice, the portions of threads 10 that extend out of the wound band roll should be longer and preferrably many times longer, than the width or the axial extension of the band roll. Generally, the dimensioning and configuration of the frame structure is based partly on the pressure drop minimization and partly on the endeavour after a turbulent air flow, and also on a maximal friction contact.

According to one feasible embodiment of the invention, the particle separator unit may comprise threads or flexible elements 10, 10' of at least two different materials or material sorts having different polarities, for instance a first material with a strongly positive charge and a second material with a strongly negative charge. The first material may for instance be wool, cotton or similar, while the second material may be made of a plastic polymer, such as polypropylene. Moreover, the unit may also include threads or elements of the electrete fiber type. Metal fibers, such as copper fibers, are also feasible. In a way known per se, the individual thread 10 or 10' may advantageously be built up of a large plurality of individual fibers which, although they all extend axially in the direction of the thread, confer an inner, irregular structure to the thread by their inherent, not wholly straight but variably irregular form, said structure comprising a multitude of cavities or labyrinths of varying forms in which micro particles can be stuck. Inter alia, this means that the micro particles being attracted to the threads are solely caught by the exterior of the thread, whereafter they creep inwards, into the interior of the thread, where they adhere to individual fibers. However, the fibers being located on the surface of the thread continue to rub against adjacent threads and in this way the thread will continuously generate an electrostatic charge without being hindered by any substantial particle agglomerations on the surface fibers.

The apparatus depicted in FIG. 1 functions in the following way. Air from the surrounding room is sucked in by fan 5, into the interior of the apparatus via inlet 8 of the outer tube or housing 6 and then in turn it passes inlet filter 12, UV-lamp 15, fan 5, particle separation unit 4 and outlet filter 13. A considerable part of primarily somewhat coarser particles are removed in fixed filter 12 and bacteria and virus brought by air are killed in the area of lamp 15. After having passed fan 5, the air is pressed through unit 4, more specifically through its frame structure 11 in a first step and then through the thread or element inset 10 in a second step. Because of the pressing effect of fan 5, a turbulent air flow is created which contributes to setting the individual threads or elements of thread inset 10 into lively motion in relation to each other, whereby the threads are rubbed against each other, bringing about an electrostatic charging of their fibers. As previously mentioned, the capacity of the threads to capture micro particles out of air will therefore be upheld at a high level for long periods of time, more specifically as long as unit 4 is kept open and threads or elements 10 are not saturated with particles or particle agglomerations. Finally, the air passes through outlet filter 13 before it is recycled into the room; now in purified condition.

Furthermore, by a suitable choice of material in the elements 10 of particle separator unit 4, an ionizing effect may be obtained upon the air passing through the apparatus. Thus, if the unit elements include material producing a large negative charge during the rubbing operations mentioned above, negatively charged ions will be produced and delivered with the air into the surrounding room. In this way, it is considered that the air comfort is improved.

Feasible modifications of the Invention

Obviously, the invention is not restricted solely to the embodiment described above and illustrated in the drawings. Thus, within the scope of the appended claims, the practical design of the frame structure as well as of the flexible and/or floppy elements comprised in the particle separation unit, may be varied in many ways. The essence is that the frame structure shall have a sustaining, stiff character and be air-pervious, at the same time as the elements located downstreams of the frame structure shall be movable and deformable so that they can be set in motion by the passing air and be rubbed against each other, thus effecting a continuous charging of the elements with static electricity. It should be further noted that the device in which the particle separation unit is included may have the character of a simple tube that may be used for other purposes than for a detached circulation apparatus of the type illustrated in FIG. 1. Thus, such an ordinary tube may be used in larger air cleaning units, for instance in units comprising other means, such as cyclons, filters and similar, for the removal of coarser constituents and particles, before the air reaches the particle separation unit according to the invention. It is also feasible to mount the particle separation unit definitely and irreversibly into the tube, although advantageously, it is mounted replaceably in the surrounding tube, thus making it possible to remove the unit and replace it by a fresh one. In the former case, the particle separator forms a unit together with the tube, which unit may be discarded and replaced by a fresh unit in the form of a particle separator with a tube.

Although the invention has been described above and defined in the claims as applicable in connection with the separation of micro particles out of air, it is evident that it is useful for the same purpose with other gases than just air.

I claim:

1. Device for the separation of microscopic particles out of air, comprising a tube (1) through which particle-containing air is brought to pass from an inlet (2) towards an outlet (3), and in which there is a particle separation unit (4) comprising a multitude of elongated, flexible or floppy elements (10) being held together at their ends by a common, air-pervious frame structure (11) that extends across the longitudinal extension of the tube and substantially completely restrains the air passage in this cross-section of the tube, thus forcing the air to penetrate through said frame structure, the deformable parts of said elements (10) located downstream of the frame structure (11) being arranged to be set in motion in relation to each other by the passing air so as to effect a continuous rubbing of the elements against each other during running, thus generating static electricity for attracting micro particles from the air to the elements, wherein the frame structure (11) is made of at least one flexible band (16, 16') on which said flexible elements (10,10') are affixed, and which band is formed into loops, with one end of each element (10, 10') being located amongst the band loops, and in that a plurality of pipe-or tube means (17), are included in the frame structure amongst the band loops, in order to facilitate and distribute the air flow through the frame structure.

2. Device according to claim 1, wherein the set of elements (10) held together by the frame structure comprises elements (10, 10'; 18, 18') of at least two different materials with differing polarities.

3. Device according to claim 2, wherein the flexible elements are thread-or strip-formed and are made of a material selected from the group consisting of wool fibers, polymer fibers, electrete fibers and metal fibers.

4. Device according to claim 3, wherein, the tube (1) containing the particle separation unit (4) is in turn mounted within an outer housing or envelope (6) with an inlet and an outlet (8, 9) between which the air passes, one or several separate, replaceable air filter means (12, 13) being provided besides the particle separation unit (4), in the housing and/or the tube between said inlet (8) and outlet (9).

5. Device according to claim 4, wherein a fan (5, 5') is provided within the tube (1, 6') upstream of the particle separation unit (4) for driving the air through said unit, in order to attain the most turbulent possible flow of air through the set of elements (10).

6. Device according to claim 4, wherein a bacteria killing means (15) is provided in or adjacent to the tube, upstream of the particle separation unit (4).

7. Device according to claim 5, wherein a bacteria killing means (15) is provided in or adjacent to the tube, upstream of the particle separation unit (4).

8. Device according to claim 2, wherein, the tube (1) containing the particle separation unit (4) is in turn mounted within an outer housing or envelope (6) with an inlet and an outlet (8, 9) between which the air passes, one or several separate, replaceable air filter means (12, 13) being provided besides the particle separation unit (4), in the housing and/or the tube between said inlet (8) and outlet (9).

9. Device according to claim 8, wherein a fan (5, 5') is provided within the tube (1, 6') upstream of the particle separation unit (4) for driving the air through said unit, in order to attain the most turbulent possible flow of air through the set of elements (10).

10. Device according to claim 9, wherein a bacteria killing means (15) is provided in or adjacent to the tube, upstream of the particle separation unit (4).

11. Device according to claim 8, wherein a bacteria killing means (15) is provided in or adjacent to the tube, upstream of the particle separation unit (4).

12. Device according to claim 1, wherein the flexible elements are thread-or strip-formed and are made of a material selected from the group consisting of wool fibers, polymer fibers, electrete fibers and metal fibers.

13. Device according to claim 12, wherein, the tube (1) containing the particle separation unit (4) is in turn mounted within an outer housing or envelope (6) with an inlet and an outlet (8, 9) between which the air passes, one or several separate, replaceable air filter means (12, 13) being provided besides the particle separation unit (4), in the housing and/or the tube between said inlet (8) and outlet (9).

14. Device according to claim 13, wherein a fan (5, 5') is provided within the tube (1, 6') upstream of the particle separation unit (4) for driving the air through said unit, in order to attain the most turbulent possible flow of air through the set of elements (10).

15. Device according to claim 14, wherein a bacteria killing means (15) is provided in or adjacent to the tube, upstream of the particle separation unit (4).

16. Device according to claim 1, a bacteria killing means (15) is provided in or adjacent to the tube, upstream of the particle separation unit (4).

17. Device according to claim 1, wherein, the tube (1) containing the particle separation unit (4) is in turn mounted within an outer housing or envelope (6) with an inlet and an outlet (8, 9) between which the air passes, one or several separate, replaceable air filter means (12, 13) being provided besides the particle separation unit (4), in the housing and/or the tube between said inlet (8) and outlet (9).

18. Device according to claim 17, wherein a fan (5, 5') is provided within the tube (1, 6') upstream of the particle separation unit (4) for driving the air through said unit, in order to attain the most turbulent possible flow of air through the set of elements (10).

19. Device according to claim 18, wherein a bacteria killing means (15) is provided in or adjacent to the tube, upstream of the particle separation unit (4).

20. Device according to claim 17, wherein a bacteria killing means (15) is provided in or adjacent to the tube, upstream of the particle separation unit (4).

* * * * *